(12) United States Patent
Ghaedian et al.

(10) Patent No.: US 6,440,483 B1
(45) Date of Patent: Aug. 27, 2002

(54) METHOD AND APPARATUS FOR PRODUCING A FRUIT PRODUCT

(75) Inventors: Reza Ghaedian, Wareham; Andre LaPerriere, East Freetown, both of MA (US)

(73) Assignee: Decas Cranberry Products, Inc., Wareham, MA (US)

( * ) Notice: Subject to any disclaimer, the term of this patent is extended or adjusted under 35 U.S.C. 154(b) by 0 days.

(21) Appl. No.: 09/473,739

(22) Filed: Dec. 28, 1999

(51) Int. Cl.$^7$ .............................. A23L 1/06; A23L 1/064; A23L 1/09
(52) U.S. Cl. ................. 426/639; 426/425; 426/489; 426/615
(58) Field of Search ............... 426/639, 615, 426/425, 489

(56) References Cited

U.S. PATENT DOCUMENTS

| | | |
|---|---|---|
| 1,534,050 A | 4/1925 | Barrielle |
| 1,717,258 A | 6/1929 | Rambaud |
| 1,906,295 A | 5/1933 | Wickenden |
| 2,692,831 A | 10/1954 | Weckel et al. ............... 99/103 |
| 2,785,071 A | 3/1957 | Mathews ..................... 99/102 |
| 2,865,758 A | 12/1958 | Weckel et al. ............... 99/102 |
| 4,350,711 A | 9/1982 | Kahn et al. .................. 426/102 |
| 4,551,348 A | 11/1985 | O'Mahony et al. .......... 426/639 |
| 4,626,434 A | 12/1986 | O'Mahony et al. .......... 426/50 |
| 4,713,252 A | 12/1987 | Ismail ......................... 426/290 |
| 4,814,190 A | 3/1989 | Ismail ......................... 426/102 |
| 5,320,861 A | 6/1994 | Mantius et al. ............. 426/599 |
| 5,718,939 A * | 2/1998 | Nugent ........................ 426/639 |
| 5,747,088 A | 5/1998 | Fletcher ...................... 426/425 |

FOREIGN PATENT DOCUMENTS

| WO | WO 98/03072 | 1/1998 |
|---|---|---|

OTHER PUBLICATIONS

Khotavivattana, S., et al., Experimental development to enlarge Thai fruit candy processing into industrial scale, Kasetsart University, Bangkok (Thailand), pp. 151–186 (1985) (English translation).

Lee, et al., "How to Make Naturally Flavored Maraschino--type Cherries", *Food Industries*, 13:52–54, (Jul. 1941).

Pilnik, W., "From traditional ideas to modern fruit juice winning processes", The X International Fruit–Juice–Convention (1988), pp. 159–179.

* cited by examiner

*Primary Examiner*—Helen Pratt
(74) *Attorney, Agent, or Firm*—Bromberg & Sunstein LLP

(57) ABSTRACT

A product and method for producing a fruit product from a fruit, the fruit including soluble fruit components. The method for producing a fruit product, the fruit product including soluble fruit components, extracts a desired amount of the soluble fruit components from the fruit and infuses the extracted fruit with an infusion liquid having an amount of sugar and an amount of soluble fruit components, the amount of soluble fruit components formulated to diffuse a predetermined amount of the soluble fruit components remaining in the extracted fruit into the infusion liquid.

32 Claims, 6 Drawing Sheets

METHOD AND APPARATUS FOR PRODUCING A FRUIT PRODUCT

FIELD OF THE INVENTION

The invention generally relates to a method and apparatus for producing a fruit product, and, more particularly, the invention relates to a method and apparatus for producing a high-quality, well-defined fruit product.

BACKGROUND OF THE INVENTION

U.S. Pat. No. 5,747,088 ("the '088 patent") discloses a process for producing a fruit product. In the '088 patent process, a rapid cyclical or pulsed vacuum extracts up to 98% of the juice from a fruit by "pumping" the juice out of the fruit. By pumping the juice out of the fruit, the maximize amount of juice can be extracted from the fruit. The "fruit" that remains after pumping is then infused with a solution of sugar and food acids. One process for infusing the fruit with a solution of sugar and food acids, disclosed in U.S. Pat. No. 2,785,071, the disclosure of which is incorporated herein, in its entirety, by reference, involves the use of a flowing stream of sugar solution. It is important to note that, in the '088 patent process, food acids must be "added back" during infusion in order to provide the fruit product with "a 'fruity' taste."

U.S. Pat. No. 5,320,861 ("the '861 patent"), the disclosure of which is incorporated herein, in its entirety, by reference, also discloses a process for producing a fruit product. In the '861 patent process, a countercurrent process extracts up to 96% of the juice from the fruit. The "fruit" that remains is then infused, also using a countercurrent process, with a solution of sugar and fruit juice, the amount of fruit juice being either equal in concentration, or greater in concentration, to the amount of fruit juice remaining in the "fruit." When the amount of fruit juice is equal in concentration, the small amount of juice remaining in the extracted fruit remains in the fruit. The fruit product, however, may lack a "fruity" taste. When the amount of fruit juice is greater in concentration, juice is "added back" to the fruit, thereby providing the fruit product with a "fruity" taste.

International Patent Application WO 98/03072, the disclosure of which is incorporated herein, in its entirety, by reference, further discloses a process for producing a fruit product. In this process, up to 80% of the juice from the fruit is extracted by "pressing" the juice out of the fruit. While the fruit product may have a "fruity" taste, pressing the fruit both damages the cells in the fruit and reduces the surface area of the fruit. Even if the fruit is "plumped up" (after pressing and prior to infusion) with juice, the fruit product is not well-defined because pressed fruit can never be returned to the plumpness of the fruit prior to pressing.

Accordingly, it is desirable to provide a method and apparatus for producing a fruit product that is well-defined and does not need to have juice "added back" to the fruit.

SUMMARY OF THE INVENTION

In accordance with one embodiment of the invention, a method for producing a fruit product, the fruit product including soluble fruit components, extracts a desired amount of the soluble fruit components from the fruit and infuses the extracted fruit with an infusion liquid having an amount of sugar and an amount of soluble fruit components, the amount of soluble fruit components formulated to diffuse a predetermined amount of the soluble fruit components remaining in the extracted fruit into the infusion liquid. In an additional embodiment of the invention, the amount of soluble fruit components is further formulated to maintain the integrity of the infusion liquid.

In an alternate embodiment of the invention, the process of extracting includes bathing the fruit in an aqueous solution. In a further alternate embodiment of the invention, the aqueous solution is substantially devoid of sugar and soluble fruit components. In another alternate embodiment of the invention, the processes of extracting and infusing are carried out in batches. In a still another alternate embodiment of the invention, the fruit is sliced prior to extracting.

In a further embodiment of the invention, the process of infusing includes infusing the extracted fruit with a first infusion liquid comprising a first amount of sugar and a first amount of soluble fruit components, the first amount of soluble fruit components formulated to diffuse a first predetermined amount of the soluble fruit components remaining in the extracted fruit into the first infusion liquid, continuing infusing with the first infusion liquid until the first amount of sugar in the first infusion liquid equals a desired amount, and infusing the extracted fruit with a second infusion liquid comprising a second amount of sugar and a second amount of soluble fruit components, the second amount of soluble fruit components formulated to diffuse a second predetermined amount of the soluble fruit components remaining in the extracted fruit into the second infusion liquid.

In other further embodiments of the invention, at least some of the soluble fruit components extracted from the fruit is collected, or at least some of the infusion liquid is collected, or at least some of the infusion liquid is collected and prepared for re-use in a subsequent batch of fruit. In one embodiment of the invention, the process of preparing the infusion liquid for re-use includes evaporating the collected infusion liquid until the amount of sugar in the solution reaches a first desired amount, and adding sugar to the collected infusion liquid until the amount of sugar in the solution reaches a second desired amount.

In still other further embodiments of the invention, the sugar in the infusion liquid is replaced with a fruit juice concentrate, the infusion liquid further comprises a nutraceutical, the fruit product further comprises a flavoring different from the flavoring of the fruit, or the fruit is a cranberry. In addition, in another embodiment of the invention, the ratio of infusion liquid to fruit is, by weight, substantially 4 to 1.

In an alternate embodiment of the invention, the desired amount of the soluble fruit components extracted from the fruit is between 45–50%, the BRIX of the infusion liquid is substantially 70, and the acid content of the infusion liquid is substantially 1.2%. In another alternate embodiment of the invention, the desired amount of the soluble fruit components extracted from the fruit is between 60–65%, the BRIX of the infusion liquid is substantially 70, and the acid content of the infusion liquid is substantially 0.85%.

In accordance with another aspect of the invention, a cranberry fruit product produced from a cranberry, the cranberry including soluble fruit components, comprises a cranberry piece, from which a desired amount of the soluble fruit components have been extracted, the cranberry piece including an amount of sugar and an amount of soluble fruit components, the amount of soluble fruit components formulated to diffuse a predetermined amount of the soluble fruit components remaining in the extracted fruit into the infusion liquid. In an alternate embodiment of the invention, the sugar in the solution is replaced with a fruit juice concentrate. In a further alternate embodiment of the invention, the fruit product further includes a flavoring different from the flavoring of the cranberry.

In accordance with a further aspect of the invention, an apparatus for producing a fruit product from a fruit, the fruit including soluble fruit components, comprises a tank having a top opening, a sidewall, a bottom, and a bottom opening; the top opening of the tank being larger in size than the bottom opening of the tank, first piping disposed within the tank, the first piping allowing fluids to disperse around the circumference of the tank, second piping being disposed within the tank, the second piping allowing fluids to disperse over the top opening of the tank, and a stirring arm disposed within the tank, the stirring arm capable of circulating the contents of the tank. In an alternate embodiment of the invention, the apparatus further comprises one or more outlets in the bottom of the tank and a screen partially covering the inside bottom surface of the bottom of the tank.

In a further embodiment of the invention, the stirring arm is configured as two parallel, horizontal bars connected by a perpendicular, vertical bar, the perpendicular bar being shorter in length than the parallel bars. In a still further embodiment of the invention, the top opening of the tank may be substantially round in shape, and the bottom of the tank may be substantially frusto-conical in shape.

In other embodiments of the invention, the first piping may be used to disperse an extraction liquid, or used to disperse an infusion liquid. In additional embodiments of the invention, the second piping may be used to disperse an infusion liquid, or the soluble fruit components of the fruit may be drained from the tank through the outlet in the bottom of the tank. In still additional embodiments of the invention, an infusion liquid is drained from the tank through the outlet in the bottom of the tank, or the fruit is drained from the tank through the bottom opening. In one embodiment of the invention, the fruit is drained from the tank as a fluid mass through the bottom opening.

BRIEF DESCRIPTION OF THE DRAWINGS

The foregoing and other objects and advantages of the invention will be appreciated more fully from the following further description thereof with reference to the accompanying drawings wherein.

DESCRIPTION OF THE INVENTION

In accordance with one aspect of the invention, a well-defined fruit product is produced using a two-step process that extracts a desired amount of soluble fruit components, i.e., juice, from a fruit and then, during the step of infusion, infuses the fruit with an amount of sugar and extracts a pre-determined amount of additional juice from the fruit.

Figure 1:
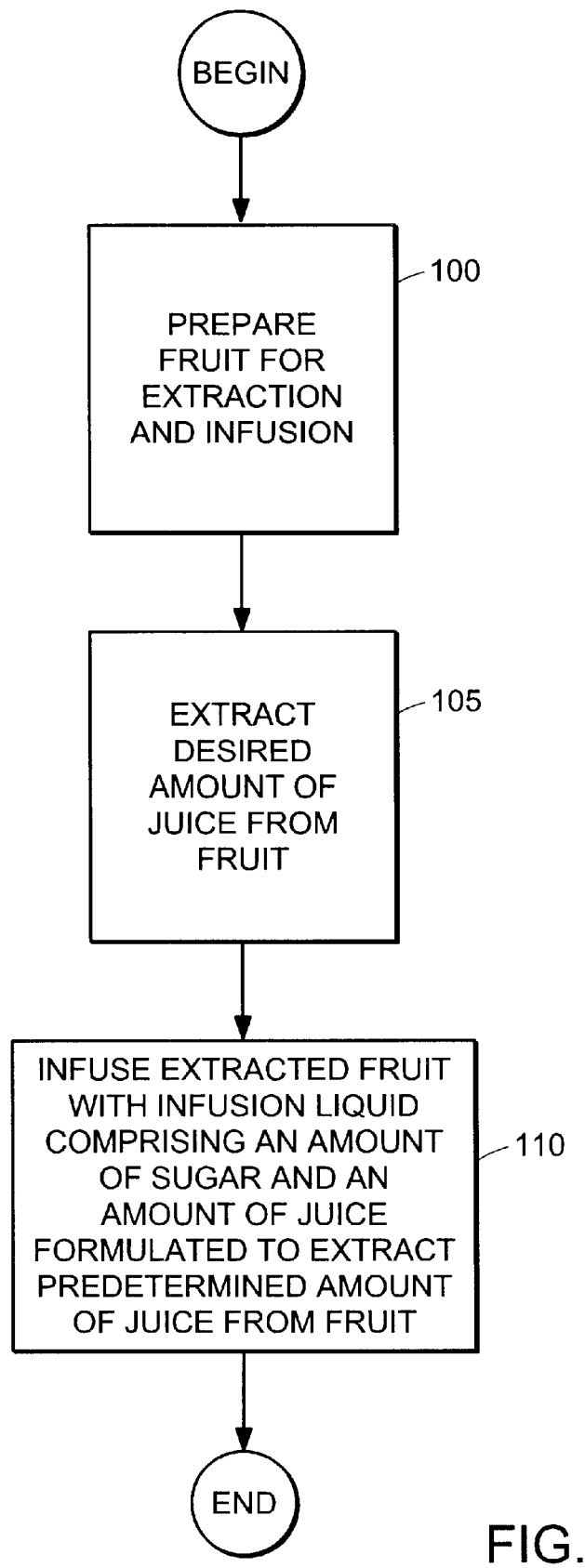
FIG. 1 shows an exemplary process for implementing various embodiments of the invention.

FIG. 1 shows an exemplary process for implementing various embodiments of the invention. In step 100, a fruit is prepared for extraction and infusion (discussed below).

Next, at step 105, juice is extracted from the fruit. For example, the prepared fruit may be bathed in an aqueous solution until the desired amount of juice has been extracted. In most embodiments of the invention, the aqueous solution is substantially free of sugar and juice, e.g., it is water, a known extraction liquid. The amount of juice extracted from the fruit is based on the amount of juice desired in the fruit product. The amount of juice in a fruit product, i.e., the fruit acid content of the fruit, affects the taste of the fruit product. For example, a fruit product with a low fruit acid content, i.e., a low amount of juice, has less "fruit" taste than when the fruit product has a higher fruit acid content, i.e., a higher amount of juice. Accordingly, depending on the desired fruit product, as little as substantially 35% and as much as substantially 80% of the weight of the fruit may be extracted from the fruit as juice.

The process continues at step 110, in which the extracted fruit is infused with an infusion liquid. The infusion liquid comprises an amount of juice from the fruit and an amount of sugar. In an alternate embodiment of the invention, the infusion liquid may comprise an amount of juice from the fruit and an amount of fruit juice concentrate, e.g., apple juice concentrate, grape juice concentrate, pear juice concentrate, etc. In another alternate embodiment of the invention, the infusion liquid may comprise, in addition to an amount of juice from the fruit and an amount of sugar or fruit juice concentrate, an amount of nutraceuticals, e.g., vitamins, herbs, anti-oxidants, etc.

The amount of juice from the fruit in the infusion liquid is formulated to extract a predetermined amount of the juice remaining in the extracted fruit into the infusion liquid, referred to as net extraction. The amount of juice from the fruit in the infusion liquid is based on, among other factors, the amount of juice previously extracted from the fruit and the amount of juice desired in the fruit product. The infusion process concludes when the amount of sugar (or fruit juice concentrate) in the extracted fruit is substantially equal to the amount of sugar (or fruit juice concentrate) remaining in the infusion liquid (not shown).

Table A (shown below) lists various examples of formulations for an infusion liquid. The exemplary formulations are calculated, for producing the listed fruit product, from fruit having an acid content between substantially 2.1% and substantially 2.6%, e.g., cranberries. In the examples, the BRIX of the infusion liquid is substantially 70 and the ratio of infusion liquid to fruit is 4 parts infusion liquid to 1 part fruit. As noted above, the fruit acid content of a fruit is a measurement of the amount of juice in the fruit. Similarly, the fruit acid content of an infusion liquid is a measurement of the amount of juice in the infusion liquid. Thus, Table A shows acid content percentages rather than amounts of juice.

TABLE A

| % Juice Extracted From Fruit | % Acid Content of Extracted Fruit (as result of extraction) | Desired % Acid Content of Fruit Product (after infusion) | % Acid Content of Infusion Liquid |
|---|---|---|---|
| 35–40 | Substantially 1.6 | Substantially 1.4 | Substantially 1.35 |
| 45–50 | Substantially 1.4 | Substantially 1.23 | Substantially 1.2 |
| 60–65 | Substantially 1.2 | Substantially 0.9 | Substantially 0.85 |
| 70–80 | Substantially 0.6 | Substantially 0.5 | Substantially 0.50 |

The formulations may be modified for use with fruits or vegetables having acid contents less than or greater than between substantially 2.1% and substantially 2.6%. For example, the various embodiments of the invention may be used with blueberries, raspberries, strawberries, cherries, sour cherries, peaches, pears, plums, apples, pineapples, cantaloupes, etc. In addition, the various embodiments of the invention may be used with vegetables, e.g., carrots, cucumbers, broccoli, cauliflower, celery, etc.

Table B (shown below) lists additional examples of formulations for an infusion liquid. The exemplary formulations are calculated, for producing the listed produce product, for use with any fruit or vegetable. In the examples, the BRIX of the infusion liquid is substantially 70 and the ratio of infusion liquid to fruit is 4 parts infusion liquid to 1 part fruit. As in Table A, Table B shows acid content percentages rather than amounts of juice.

TABLE B

| % Acid Content of Extracted Produce (as result 6f extraction) | Desired % Acid Content of Produce Product (after infusion) | % Acid Content of Infusion Liquid |
| --- | --- | --- |
| Substantially 2.4 | Substantially 2.2 | Substantially 2.15 |
| Substantially 2.2 | Substantially 2.0 | Substantially 1.95 |
| Substantially 2.0 | Substantially 1.8 | Substantially 1.75 |
| Substantially 1.8 | Substantially 1.6 | Substantially 1.55 |
| Substantially 1.6 | Substantially 1.4 | Substantially 1.35 |
| Substantially 1.4 | Substantially 1.23 | Substantially 1.2 |
| Substantially 1.2 | Substantially 0.9 | Substantially 0.85 |
| Substantially 1.0 | Substantially 0.75 | Substantially 0.7 |
| Substantially 0.8 | Substantially 0.55 | Substantially 0.55 |
| Substantially 0.6 | Substantially 0.5 | Substantially 0.5 |

The exemplary process described in FIG. 1 produces a fruit product that is plump and substantially similar in size and shape to the original fruit piece, i.e., a well-defined fruit product. A fruit piece is a portion of a fruit, up to and including the whole fruit. Moreover, the produced fruit product maintains the characteristic flavor of the original fruit, without the need to have juice "added back" to the fruit during the process of infusion. In addition, because the amount of juice extracted into the infusion liquid during the process of infusion is controlled, the integrity of the infusion liquid is not compromised. The integrity of the infusion liquid is compromised when the entire amount of infusion liquid cannot be processed for re-use in subsequent batches of fruit or in subsequent stages of the current batch of fruit. In other words, some amount of the infusion liquid, including the entire amount of infusion liquid, must be discarded as a waste product. The infusion liquid must be discarded as a waste product because, ultimately, the juice content of the infusion liquid equals or exceeds the juice content of the fruit. As a result, net extraction cannot occur, i.e., juice cannot be extracted from the fruit during the process of infusion.

Figure 2A:
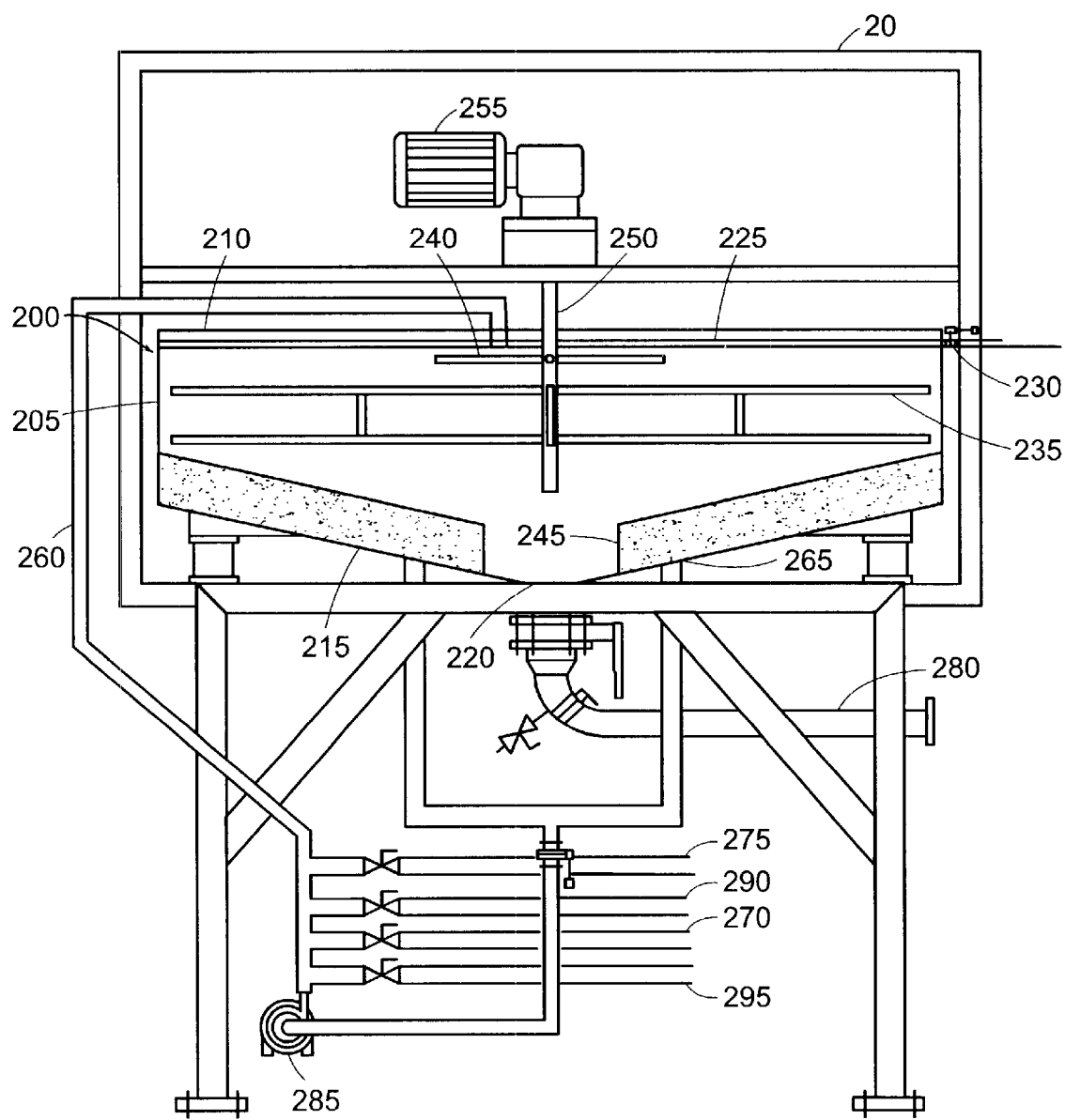
FIGS. 2a through 2c show an exemplary apparatus for implementing various embodiments of the invention.
Figure 2B:
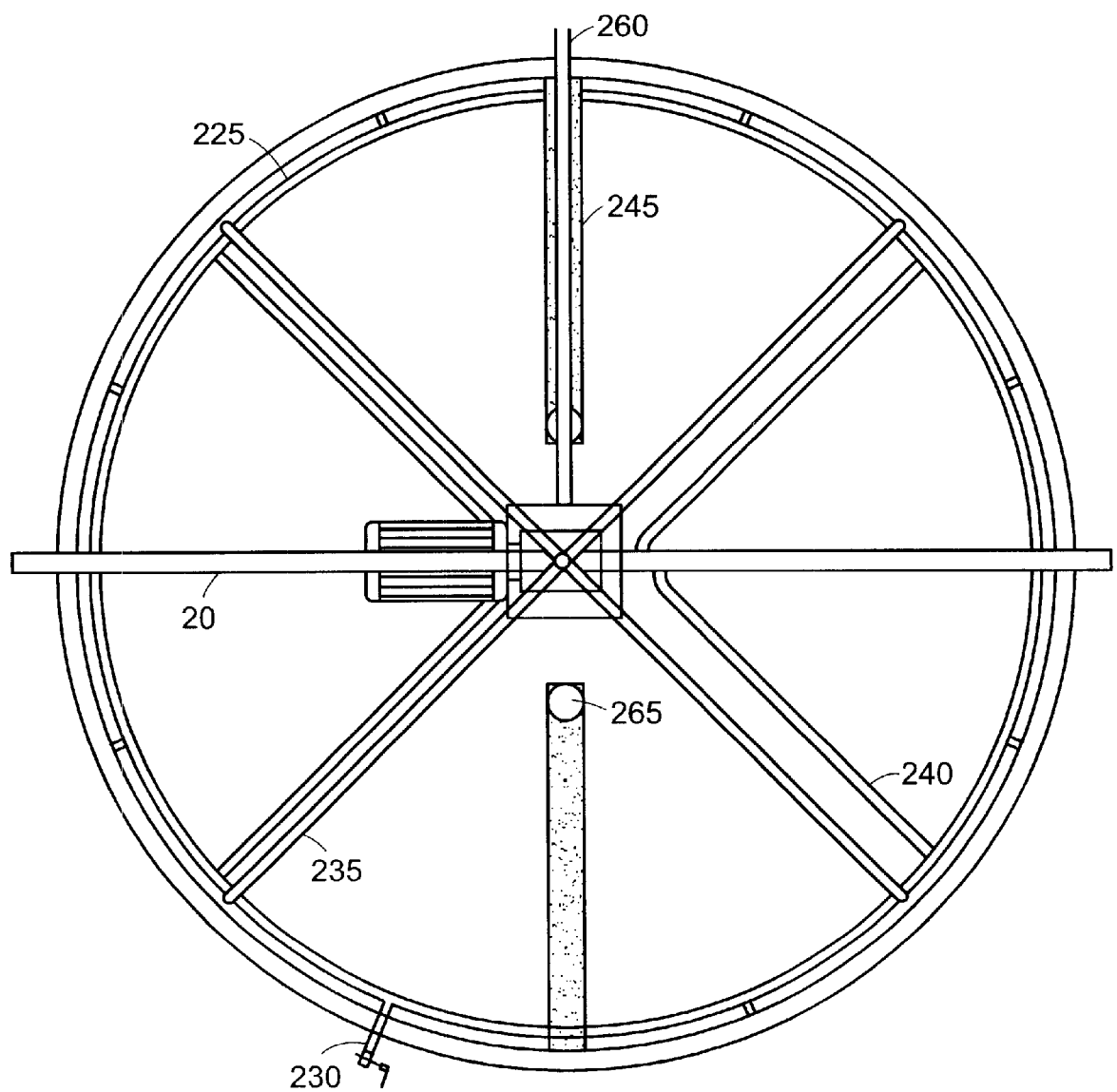
Figure 2C:
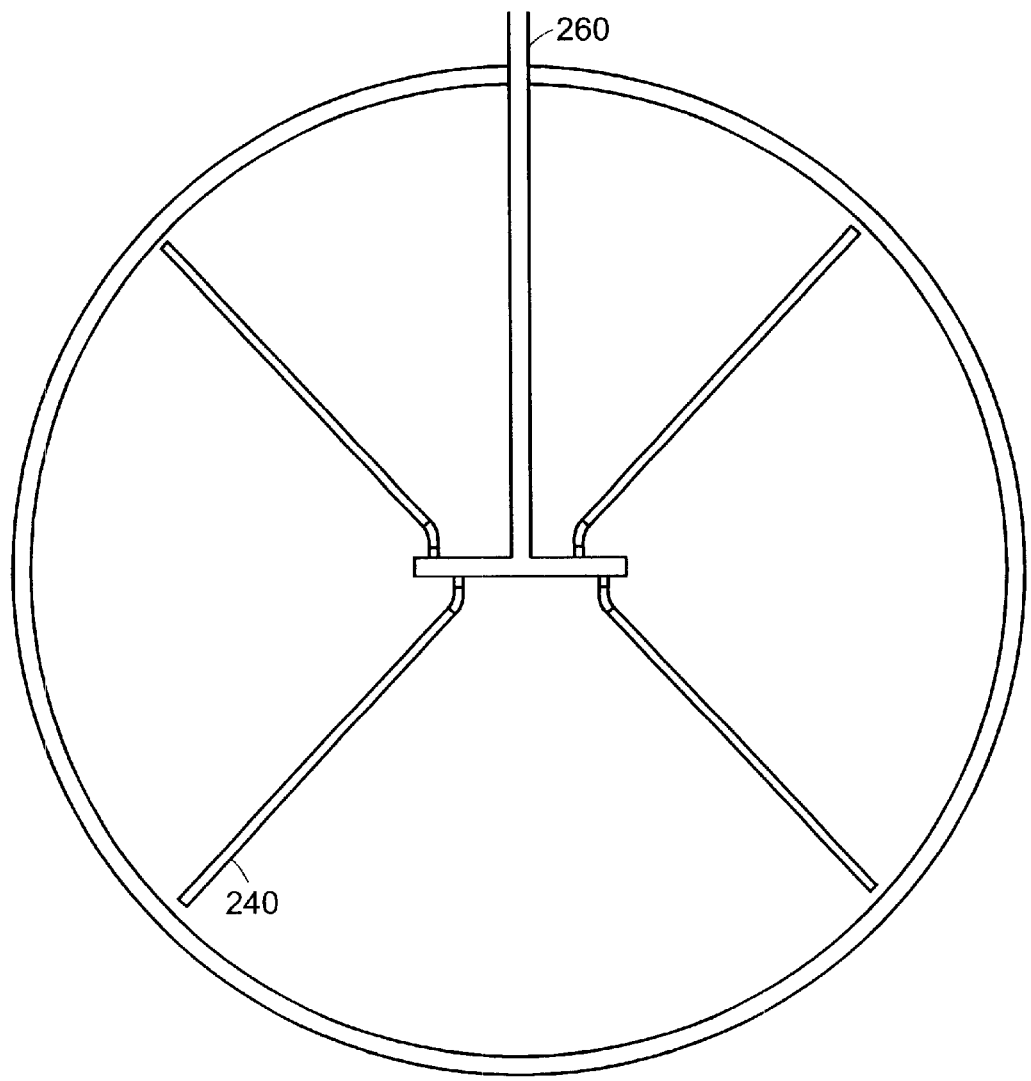

FIGS. 2a through 2c show an exemplary apparatus for implementing various embodiments of the invention. In particular, FIG. 2a shows a side view of the exemplary apparatus, FIG. 2b shows a top view of the exemplary apparatus, and FIG. 2c shows a partial top view of the exemplary apparatus. The apparatus, referred to generally as tank 200, is mounted within structural framework 20. Tank 200 is composed of sidewall 205, top opening 210, bottom walls 215, and bottom opening 220. Bottom walls 215 slope downward at a 15° angle toward bottom opening 220 to form a substantially frusto-conical shaped bottom. In one embodiment of the invention for processing 6500 pound batches of fruit, sidewall 205 is 30 inches high, top opening 210 is 14 feet in diameter, and bottom opening 220 is 12 inches in diameter.

Tank 200 also includes spray ring 225, which may be affixed to the inside surface of sidewall 205. Spray ring 225 is connected, via flow panel valve 230, to a flow panel (not shown). Spray ring 225 may be affixed to the inside surface of tank 200 substantially near top opening 210. In the embodiment of the invention for processing 6500 pound batches of fruit, spray ring 225 is a one and one-half inch diameter pipe perforated along its circumference with one quarter inch holes.

Tank 200 further includes stirring arm 235, spray bar 240, and extraction screen 245. Stirring arm 235 is connected via shaft 250 to stirring drive 255. Stirring drive 255, which may be mounted to framework 20, slowly rotates stirring arm 235. In one embodiment of the invention, stirring arm 235 is configured as four sets of three bars—two parallel, horizontal bars connected to each other via a perpendicular, vertical bar. As shown in FIG. 2a, the three bars form an "I" with an elongated top and bottom. In addition, as shown in FIG. 2b, stirring arm 235 crisscrosses tank 200.

Spray bar 240 is connected to shaft 250, above stirring arm 235. It is also connected to spray bar supply pipe 260. In one embodiment of the invention, viewed best in FIG. 2c, spray bar 240 is configured as four angled arms extending from a center support. In addition, spray bar 240 crisscrosses tank 200. In the embodiment of the invention for processing 6500 pound batches of fruit, spray bar 240 is a one and one-half inch diameter pipe perforated along its underside with one half inch holes.

Extraction screen 245, which may be affixed to the top surface of bottom 215, covers tank outlet 265. Extraction screen 245 prevents the drainage of fruit from tank 200 when, for example, juice (i.e., extraction liquid after completion of the extraction process) is drained from tank 200 through tank outlet 265. Extraction screen 245 may cover the entire top surface, or only a portion of the top surface, of bottom 215. In the embodiment of the invention for processing 6500 pound batches of fruit, tank outlet 265 is 4 inches in diameter.

Tank outlet 265 connects, ultimately, with two outlet pipes, infusion liquid outlet pipe 270 and juice outlet pipe 275. These two outlet pipes connect, via valves, to spray bar supply pipe 260.

Tank 200 has one other outlet, fruit outlet pipe 280. Fruit outlet pipe 280 is connected, via a valve, to bottom opening 220. In one embodiment, discussed below, the infused fruit is floated out of tank 200 via fruit outlet pipe 280.

Tank 200 has four inlets. The first inlet, discussed above, is flow panel valve 230. In one embodiment, discussed below, the extraction liquid and the first infusion liquid enter tank 200 via flow panel valve 230. The second inlet, also discussed above, is spray bar supply pipe 260.

Spray bar supply pipe 260 is connected to infusion pump 285. During infusion, infusion pump 285 re-circulates infusion liquid, taken from tank 200 via tank outlet 265, to the top of tank 200, through spray bar supply pipe 260 and spray bar 240. Spray bar supply pipe 260 is also connected, via valves, to the third inlet, infusion liquid inlet pipe 290. In one embodiment, discussed below, the second infusion liquid enters tank 200 via infusion liquid inlet pipe 290.

The fourth inlet, also connected to spray bar supply pipe 260, via valves, is cleaning water inlet pipe 295. Water for cleaning tank 200 enters tank 200 via cleaning water inlet pipe 295.

Figure 3:
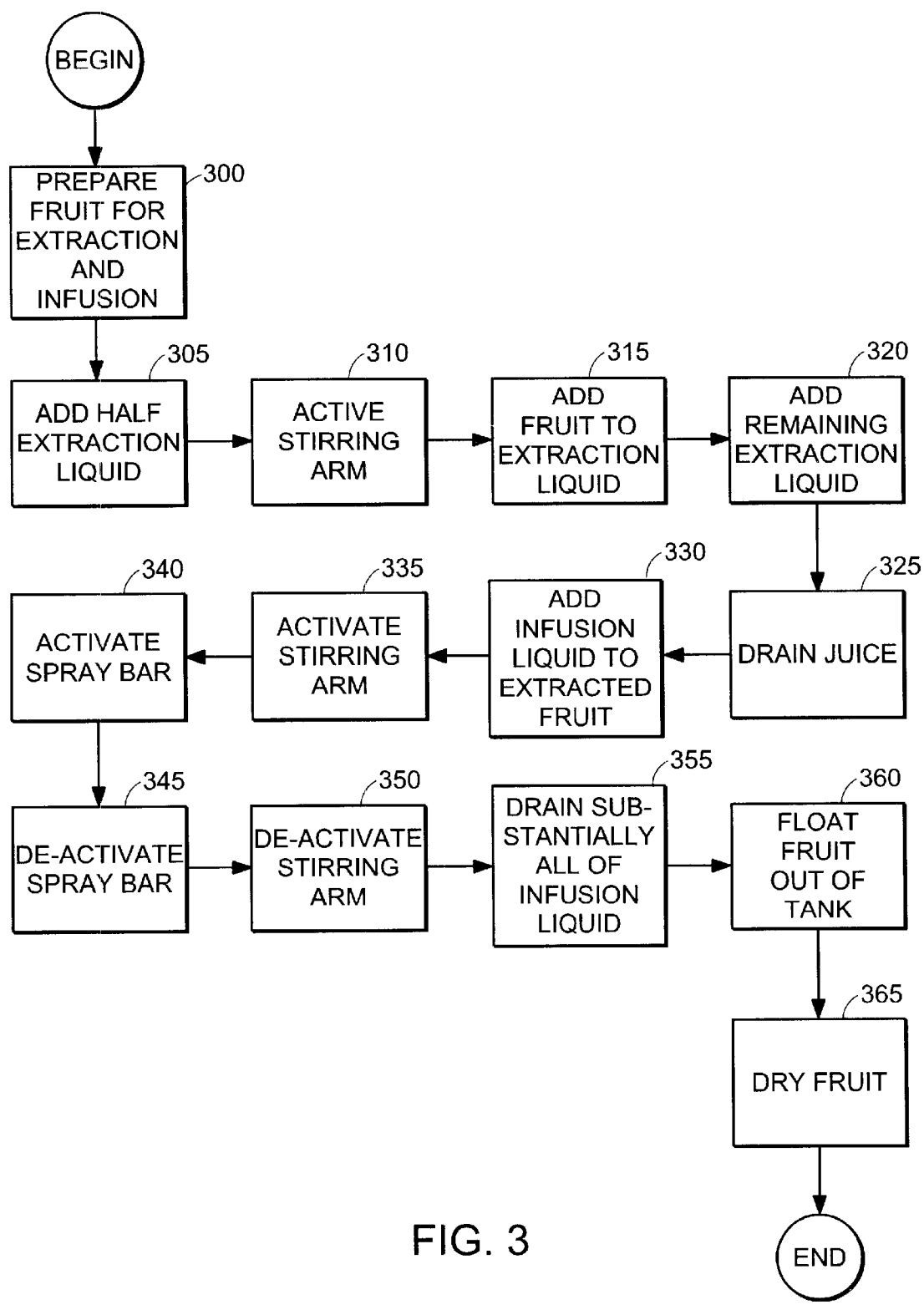
FIG. 3 shows an exemplary process for implementing various embodiments the invention using the exemplary apparatus described in FIG. 2.

FIG. 3 shows an exemplary process for implementing various embodiments of the invention using tank 200. For ease of explanation, a 6500pound batch of cranberries will be processed in tank 200.

The process begins at step 300, in which the cranberries are prepared for extraction and infusion (discussed below).

The process continues at step 305, in which substantially half the water needed for extraction is added to tank 200, via flow panel valve 230, through spray ring 225. The amount of water needed for extraction depends on, among other factors, the amount of juice to be extracted from the fruit. For example, 840 gallons of water are needed to extract 50% of the juice from the 6500 pound batch of cranberries. The temperature of the water should be 135° F.

At step 310, stirring arm 235 is activated, causing the water in tank 200 to gently circulate. The rotation speed of stirring arm 235 is dependent upon the fruit being processed. For example, stirring arm 235 rotates more slowly for tender fruit, such as strawberries. In addition, stirring arm 235 helps keep the cranberries beneath the surface of the extraction liquid and, thereby, in more or less continuous contact with the extraction liquid. The process continues at step 315, in which the cranberries are added to the water. The gently circulating water cushions the entry of the cranberries into the water in tank 200. At step 320, the remainder of the water needed for extraction (also at a temperature of 135° F.) is added, in the same manner as before, to the gently circulating mixture of water and cranberries already in tank 200. Once again, the gently circulating mixture cushions the cranberries from the entry of the water into tank 200.

The time for extraction of the juice from a fruit varies according to numerous factors, e.g., the type of fruit, the ratio of fruit to extraction liquid, the ratio of water temperature to fruit temperature, etc. In regard to water temperature ratio, for example, if the temperature of the water is too cold in relation to the temperature of the fruit, the extraction process takes a longer amount of time. However, if the temperature of the water is too high in relation to the temperature of the fruit, the fruit's pectin is extracted from the fruit. The removal of the fruit's pectin during extraction detrimentally affects the ultimate quality of the fruit product.

The process now continues at step 325, in which substantially all of the juice is drained from tank 200 via extraction screen 245 (which prevents the fruit from leaving with the juice) through tank outlet 265. For the 6500 pound batch of cranberries, 25 gallons of juice remain in tank 200—enough to keep the cranberries partially fluid. The juice is then de-pectinized, filtered, and evaporated to a BRIX of 50 (not shown).

At step 330, tank 200 is charged with an infusion liquid via flow panel valve 230 through spray ring 225. The infusion liquid has been processed for re-use from a prior batch of cranberries (discussed below). As discussed above, the formulation of the infusion liquid, e.g. its BRIX and fruit acid content, is based on, among other factors, the amount of juice desired in the fruit product. For example, the infusion liquid may have a BRIX of substantially 70 and a fruit acid content of substantially 1.2%. If 50% of the juice has been extracted from the 6500 pound batch of cranberries, then the resultant fruit product will have a fruit acid content of substantially 1.2%.

In order to allow substantial contact of the fruit with the infusion liquid, the ratio of fruit to infusion liquid in tank 200 is 1 part fruit to 4 parts infusion liquid, by weight. Thus, for the 6500 pound batch of cranberries, tank 200 would be charged with 2200 gallons of infusion liquid. The 1:4 ratio allows the fruit to "float" in the infusion liquid. In addition, the 1:4 ratio minimizes the amount of time needed to infuse the fruit. The temperature of the mixture of fruit and infusion liquid is between 85° F. and 95° F.

At step 335, stirring arm 235 is activated, gently circulating the mixture of cranberries and infusion liquid. At this point in the process, the density of the cranberries is lighter than the density of the infusion liquid. Thus, the cranberries will float on the surface of the infusion liquid. Stirring arm 235 helps keep the cranberries beneath the surface of the infusion liquid and, thereby, in more or less continuous contact with the infusion liquid.

In addition, at step 340, spray bar 240 is activated. Spray bar 240 sprays a mist of the infusion liquid over the top of the mixture in tank 200. In turn, the mist gently keeps the cranberries beneath the surface of the infusion liquid. The use of spray bar 240 in tank 200 eliminates the need for an infusion screen in tank 200. Typically, an infusion screen would be placed near the surface of the infusion liquid, in an effort to keep the fruit beneath the surface of the infusion liquid. When using an infusion screen, the fruit will press against the underside of the screen, thereby damaging the fruit. The gentle mist from spray bar 240 does not damage the fruit.

At step 345, spray bar 240 is de-activated. At this point in the process, the cranberries are fluidized, i.e., the density of the cranberries now equals the density of the infusion liquid. Accordingly, the cranberries no longer float on the surface of the infusion liquid. At step 350, stirring arm 235 is de-activated. At this point in the process, the BRIX of the cranberries is substantially the same as the BRIX of the infusion liquid. A periodic test of the BRIX of the infusion liquid and the fruit helps determine when the fruit and the infusion liquid are at equilibrium, i.e., the BRIX of the fruit equals the BRIX of the infusion liquid. At step 355, substantially all of the infusion liquid is drained from tank 200 via tank outlet 265. For the 6500 pound batch of cranberries, 200 gallons of the infusion liquid remains in tank 200, enough to keep the cranberries partially fluid.

At step 360, the cranberries are floated out of tank 200 via fruit outlet pipe 280. Because the cranberries are a fluid mass, the cranberries remain intact as they float out of tank 200. At step 365, the cranberries are dried. For example, a 10-module belt dryer may be used to dry the cranberries. Prior to packaging, the cranberries may be sprayed with an oil, e.g., a vegetable oil (not shown).

Figure 4:
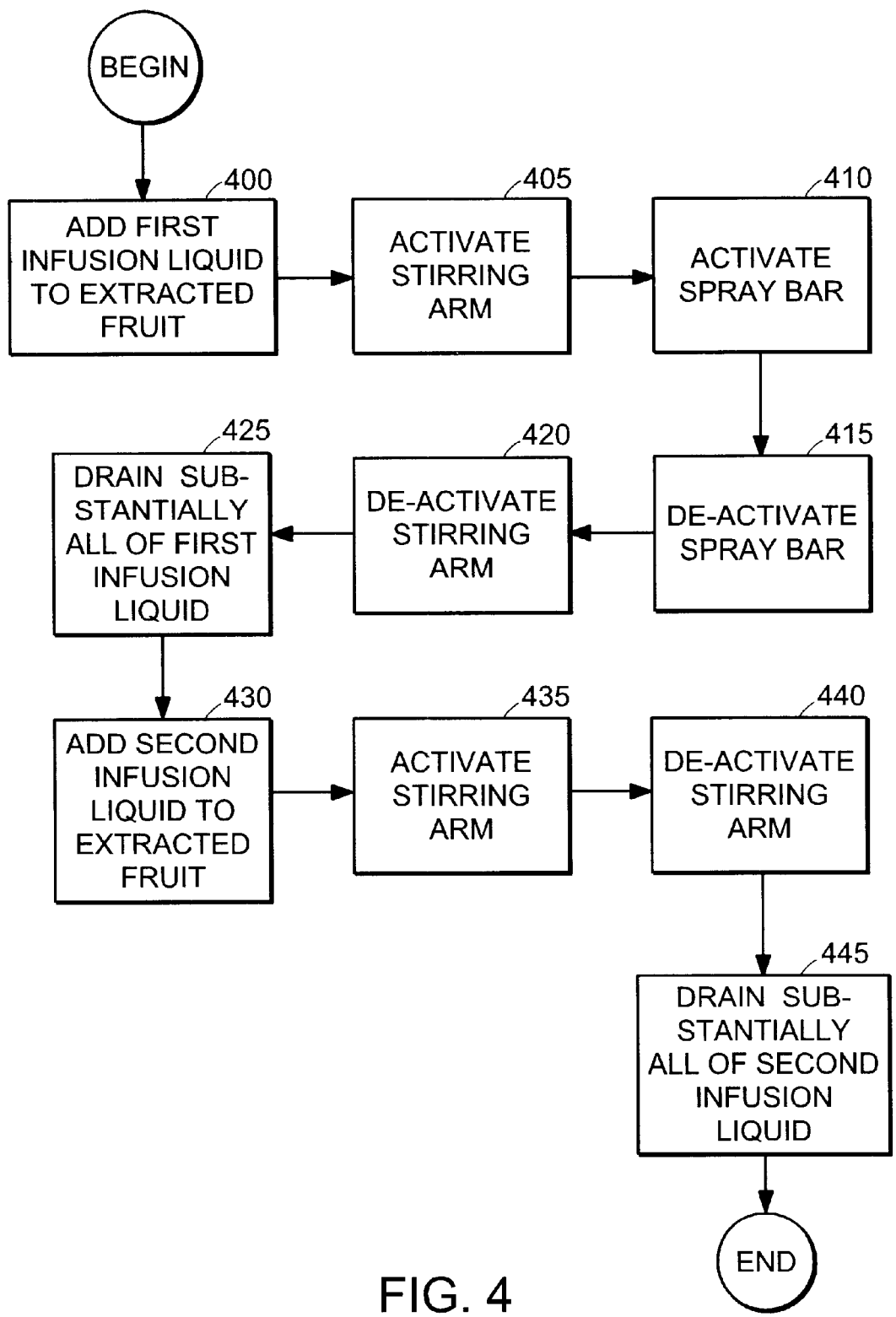
FIG. 4 shows another exemplary process for implementing various embodiments of the invention using the exemplary apparatus described in FIG. 2.

In an alternate embodiment of the invention, the infusion process occurs in stages. For example, as shown in FIG. 4, the infusion process may occur in two stages. As in the exemplary process shown in FIG. 3, for ease of explanation, a 6500 pound batch of cranberries will be processed in tank 200.

The process begins at step 400, in which tank 200 (containing a mixture of juice and cranberries, similar to FIG. 3, step 325) is charged with a first infusion liquid via flow panel valve 230 through spray ring 225. The first infusion liquid has been processed for re-use from the second infusion liquid drained from tank 200 during the processing of a prior batch of cranberries (discussed below). As discussed above, the formulation of the infusion liquid, e.g. its BRIX and fruit acid content, is based on, among other factors, the amount of juice desired in the fruit product. For example, the first infusion liquid may have a BRIX between 52 and 58 and a fruit acid content of substantially 1.2%. If the second infusion liquid has a BRIX of substantially 70 and a fruit acid content of substantially 1.2%, and 50% of the juice has been extracted from the 6500 pound batch of cranberries, then the resultant fruit product, after the process of infusion is complete, will have a fruit acid content of substantially 1.2%.

As in the exemplary process shown in FIG. 3, in order to allow substantial contact of the fruit with the first infusion liquid, the ratio of fruit to first infusion liquid in tank 200 is 1 part fruit to 4 parts first infusion liquid, by weight. Thus, for the 6500 pound batch of cranberries, tank 200 would be charged with 2200 gallons of the first infusion liquid. The temperature of the mixture of fruit and first infusion liquid is between 85° F. and 95° F.

At step 405, stirring arm 235 is activated, gently circulating the mixture of cranberries and first infusion liquid. As discussed above, at this point in the process, the density of the cranberries is lighter than the density of the first infusion liquid. Thus, the cranberries will float on the surface of the first infusion liquid. Stirring arm 235 helps keep the cranberries beneath the surface of the first infusion liquid and, thereby, in more or less continuous contact with the first infusion liquid.

In addition, at step 410, spray bar 240 is activated. Spray bar 240 sprays a mist of the first infusion liquid over the top of the mixture in tank 200. In turn, the mist gently keeps the cranberries beneath the surface of the first infusion liquid. At step 415, spray bar 240 is de-activated At this point in the process, the cranberries are fluidized, i.e., the density of the cranberries now equals the density of the first infusion liquid. Accordingly, the cranberries no longer float on the surface of the first infusion liquid. At step 420, stirring arm 235 is de-activated.

In this exemplary embodiment, stirring arm 235 is de-activated (and step 425 begun) prior to the cranberries reaching equilibrium with the first infusion liquid. Equilibrium occurs when the BRIX of the fruit equals the BRIX of the infusion liquid. The reason stirring arm 235 is de-activated now (and step 425 begun) is twofold—to optimize both infusion rates and production time.

The rate of infusion is dependent on a number of factors, e.g., the BRIX of the infusion liquid, the weight of the infusion liquid, the BRIX of the fruit, the weight of the fruit, etc. Thus, as the BRIX of the fruit increases and, correspondingly, the BRIX of the infusion liquid decreases, the rate of infusion decreases and, eventually, at equilibrium, reaches zero. de-activated prior to equilibrium and, as discussed below, tank 200 is charged with a second infusion liquid-one having a higher BRIX than the current BRIX of the first infusion liquid.

In other embodiments of the invention, stirring arm 235 may be de-activated when the fruit being infused is at equilibrium with the first infusion liquid. A periodic test of the BRIX of an infusion liquid and a fruit helps determine when a fruit and a infusion liquid are at equilibrium.

The process now continues at step 425, in which substantially all of the first infusion liquid is drained via tank outlet 265 from tank 200. For the 6500 pound batch of cranberries, 200 gallons of the first infusion liquid remains in tank 200—enough to keep the cranberries partially fluid. At step 430, tank 200 is charged with a second infusion liquid via infusion inlet pipe 280.

The second infusion liquid is recycled from the first infusion liquid drained from tank 200 during the processing of either the current or prior batch of cranberries. As discussed above, the formulation of the infusion liquid, e.g. its BRIX and fruit acid content, is based on, among other factors, the amount of juice desired in the fruit product. For example, the second infusion liquid may have a BRIX of substantially 70 and a fruit acid content of substantially 1.2%. If the first infusion liquid has a BRIX between 52 and 58 and a fruit acid content of substantially 1.2%, and 50% of the juice has been extracted from the 6500 pound batch of cranberries, then the resultant fruit product will have a fruit acid content of 1.2%.

At step 435, stirring arm 235 is activated, gently circulating the mixture of cranberries and second infusion liquid and, thereby, keeping the cranberries in more or less continuous contact with the second infusion liquid. As before, the ratio of fruit to second infusion liquid is 1 part fruit to 4 parts second infusion liquid, by weight. Thus, for the 6500 pound batch of cranberries, tank 200 would be charged with 2000 gallons of the second infusion liquid. The first infusion liquid remaining in tank 200 (200 gallons) from step 425 accounts for the difference between the amount of first infusion liquid used in step 400 (2200 gallons) and amount of second infusion liquid used in step 430 (2000 gallons). The temperature of the mixture of fruit and second infusion liquid is between 95° F. and 105° F.

At step 440, stirring arm 235 is de-activated. At this point in the process, the BRIX of the cranberries is substantially the same as the BRIX of the second infusion liquid. As discussed above, a periodic test of the BRIX of an infusion liquid and a fruit helps determine when a fruit and an infusion liquid are at equilibrium, i.e., the BRIX of the fruit equals the BRIX of the infusion liquid. In the example discussed, in which the first infusion liquid has a BRIX between 52 and 58 and the second infusion liquid has a BRIX of substantially 70, the BRIX at which equilibrium is reached is between 52 and 58.

At step 445, substantially all of the second infusion liquid is drained from tank 200 via tank outlet 265. For the 6500 pound batch of cranberries, 200 gallons of the second infusion liquid remains in tank 200, enough to keep the cranberries partially fluid. As in the exemplary process shown in FIG. 3, the cranberries are then floated out of tank 200 via fruit outlet pipe 280 (not shown). As discussed above, because the cranberries are a fluid mass, the cranberries remain intact as they float out of tank 200. The cranberries are then dried and, prior to packaging, the cranberries may be sprayed with an oil, e.g., a vegetable oil (not shown).

As noted above, the entire amount of infusion liquid used in the various embodiments of the invention is prepared for re-use. For example, in the exemplary process shown in FIG. 3, the entire amount of the drained infusion liquid is prepared for re-use in a subsequent batch of cranberries. In the exemplary process shown in FIG. 4, the entire amount of the drained first infusion liquid is prepared for re-use as the second infusion liquid in the processing of the current (or subsequent) batch of cranberries. In addition, the entire amount of the drained second infusion liquid is ready for re-use, without processing, as the first infusion liquid in the processing of a subsequent batch of cranberries. In the example discussed, in which the BRIX of the first infusion is between 52 and 58 and the BRIX of the second infusion liquid is substantially 70, the BRIX of the drained second infusion liquid is between 52 and 58, the BRIX level needed for the first infusion liquid.

In an exemplary process for processing the entire amount of infusion liquid for re-use, the infusion liquid is evaporated to a particular BRIX level, e.g., from a BRIX between 30 and 40 to a BRIX between 57 and 63. Then, sugar is added to the infusion liquid until the BRIX reaches the level needed for infusion, e.g., a BRIX of 70. The addition of the sugar also decreases the acid content of the infusion liquid.

In an alternate embodiment of the invention, the dried fruit product may comprise a flavoring, or flavorings, different from the flavoring of the infused fruit, e.g., a cranberry fruit product may contain orange flavoring, or strawberry flavoring, or apricot flavoring, or peach flavoring, etc.

The process for preparing fruit for use in the method and apparatus of the invention depends, among other factors, on the fruit being processed and the desired fruit product. An exemplary process for preparing cranberries, for example, includes washing and freezing the cranberries, usually to a temperature less than 0° F. Then, the cranberries are inspected, sorted by size, and sliced, which results in cranberry pieces. A cranberry piece is a portion of a cranberry, up to and including the whole cranberry. During slicing, the cranberries are sprayed with water, which causes the cranberries to partially thaw to a temperature between 26° F. and 32° F. Last, the seeds are removed from the cranberry pieces.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for producing a well-defined fruit product, the fruit product including soluble fruit components, the method comprising:

extracting a desired amount of the soluble fruit components from a raw fruit, such amount being from substantially 35% to substantially 80% by weight; and infusing the extracted fruit with an infusion liquid having an amount of sugar and an amount of soluble fruit components under gentle conditions, the gentle conditions including formulating the amount of soluble fruit components in the infusion liquid in order to diffuse a predetermined amount of the soluble fruit components remaining in the extracted fruit into the infusion liquid and to substantially maintain the integrity of the infusion liquid, the well-defined fruit product produced mimicking the appearance and taste of the raw fruit.

2. The method according to claim 1 wherein the process of extracting includes bathing the fruit in an aqueous solution.

3. The method according to claim 2 a wherein the aqueous solution is substantially devoid of sugar and soluble fruit components.

4. The method according to claim 1 wherein the processes of extracting and infusing are carried out in batches.

5. The method according to claim 1 wherein the fruit is sliced prior to extracting.

6. The method according to claim 1 wherein the process of infusing includes:

infusing the extracted fruit with a first infusion liquid comprising a first amount of sugar and a first amount of soluble fruit components, the first amount of soluble fruit components formulated to diffuse a first predetermined amount of the soluble fruit components remaining in the extracted fruit into the first infusion liquid;

continuing infusing with the first infusion liquid until the first amount of sugar in the first infusion liquid equals a desired amount; and infusing the extracted fruit with a second infusion liquid comprising a second amount of sugar and a second amount of soluble fruit components, the second amount of soluble fruit components formulated to diffuse a second predetermined amount of the soluble fruit components remaining in the extracted fruit into the second infusion liquid.

7. The method according to claim 6, further comprising: collecting at least some of the first infusion liquid.

8. The method according to claim 7, further comprising: preparing the collected first infusion liquid for re-use as a second infusion liquid.

9. The method according to claim 6, further comprising: collecting at least some of the second infusion liquid.

10. The method according to claim 9, further comprising: re-using the collected second infusion liquid as a first infusion liquid in a subsequent batch of fruit.

11. The method according to claim 6 wherein the sugar in the first infusion liquid and the sugar in the second infusion liquid is replaced with a fruit juice concentrate.

12. The method according to claim 6 wherein the first infusion liquid further comprises a nutraceutical.

13. The method according to claim 6 wherein the second infusion liquid further comprises a nutraceutical.

14. The product as produced by the method of claim 6.

15. The method according to claim 6 wherein the gentle conditions further include a ratio of infusion liquid to fruit product, by weight, of at least substantially 4 to 1.

16. The method according to claim 1, further comprising: collecting at least some of the soluble fruit components extracted from the fruit.

17. The method according to claim 1, further comprising: collecting at least some of the infusion liquid.

18. The method according to claim 17, further comprising: preparing the collected infusion liquid for re-use in a subsequent batch of fruit.

19. The method according to claim 18 or claim 8 wherein the process of preparing includes:

evaporating the collected infusion liquid until the amount of sugar in the solution reaches a first desired amount; and adding sugar to the collected infusion liquid until the amount of sugar in the solution reaches a second desired amount.

20. The method according to claim 1 wherein the sugar in the infusion liquid is replaced with a fruit juice concentrate.

21. The method according to claim 1 wherein the infusion liquid further comprises a nutraceutical.

22. The method according to claim 1 or claim 6 wherein the fruit product further comprises a flavoring different from the flavoring of the fruit.

23. The method according to claim 1 or claim 6, wherein the fruit is a cranberry.

24. The method according to claim 1 wherein the ratio of infusion liquid to fruit is, by weight, substantially 4 to 1.

25. The method according to claim 1 wherein the desired amount of the soluble fruit components extracted from the fruit is between 45–50%, the BRIX of the infusion liquid is substantially 70, and the acid content of the infusion liquid is substantially 1.2%.

26. The method according to claim 1 wherein the desired amount of the soluble fruit components extracted from the fruit is between 60–65%, the BRIX of the infusion liquid is substantially 70, and the acid content of the infusion liquid is substantially 0.85%.

27. The product as produced by the method of claim 1.

28. The method according to claim 1 or claim 6 wherein the gentle conditions further include spraying a mist of the infusion liquid over a tank containing the fruit product to keep the fruit product beneath the surface of the infusion liquid.

29. The method according to claim 1 wherein the gentle conditions further include a ratio of infusion liquid to fruit product, by weight, of at least substantially 4 to 1.

30. A well-defined cranberry fruit product produced from a cranberry, the cranberry including soluble fruit components, the cranberry fruit product comprising:

a cranberry piece produced in a process that substantially maintains the integrity of an infusion liquid comprising an amount of sugar and an amount of soluble fruit components, from which a desired amount of soluble fruit components has been extracted, such amount being from substantially 35% to substantially 80% by weight; and, at substantially the sane time, into which the infusion liquid has been infused and a predetermined amount of the soluble fruit components remaining in the extracted fruit has been diffused into the infusion liquid, the well-defined cranberry fruit product produced mimicking the appearance and taste of the cranberry.

31. The cranberry fruit product of claim 30 wherein the infused sugar is replaced with a fruit juice concentrate.

32. The cranberry fruit product of claim 30 wherein the fruit product further includes a flavoring different from the flavoring of the cranberry.

* * * * *

UNITED STATES PATENT AND TRADEMARK OFFICE
CERTIFICATE OF CORRECTION

PATENT NO.     : 6,440,483 B1
DATED          : August 27, 2002
INVENTOR(S)    : Reza Ghaedian et al.

It is certified that error appears in the above-identified patent and that said Letters Patent is hereby corrected as shown below:

<u>Column 13,</u>
Line 7, replace "sane" with -- same --.

Signed and Sealed this

Eighteenth Day of February, 2003

JAMES E. ROGAN
*Director of the United States Patent and Trademark Office*